United States Patent
Zhao et al.

(10) Patent No.: US 11,187,654 B2
(45) Date of Patent: Nov. 30, 2021

(54) IMAGING REFLECTOMETER

(71) Applicant: Applied Materials, Inc., Santa Clara, CA (US)

(72) Inventors: Guoheng Zhao, Palo Alto, CA (US); Mehdi Vaez-Iravani, Los Gatos, CA (US); Todd J. Egan, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/944,946

(22) Filed: Jul. 31, 2020

(65) Prior Publication Data

US 2020/0355609 A1 Nov. 12, 2020

Related U.S. Application Data

(62) Division of application No. 16/295,173, filed on Mar. 7, 2019, now Pat. No. 10,816,464.

(Continued)

(51) Int. Cl.
*G01N 21/55* (2014.01)

(52) U.S. Cl.
CPC ....... *G01N 21/55* (2013.01); *G01N 2201/061* (2013.01); *G01N 2201/063* (2013.01);
(Continued)

(58) Field of Classification Search
CPC ............. G01N 21/55; G01N 2201/061; G01N 2201/063; G01N 2201/0638; G01N 2201/126; G01N 2201/127
(Continued)

(56) References Cited

U.S. PATENT DOCUMENTS 5,166,755 A 11/1992 Gat
6,437,862 B1 8/2002 Miyazaki et al.
(Continued)

FOREIGN PATENT DOCUMENTS

EP 3 428 572 A1 1/2019
JP 2019-158351 A 9/2019
(Continued)

OTHER PUBLICATIONS

International Search Report and Written Opinion for Application No. PCT/US2020/013185, dated May 8, 2020, 12 pages.
(Continued)

*Primary Examiner* — Tri T Ton
(74) *Attorney, Agent, or Firm* — Kilpatrick Townsend & Stockton LLP

(57) ABSTRACT

An imaging reflectometer includes a source module configured to generate a plurality of input beams at different nominal wavelengths. An illumination pupil having a first numerical aperture (NA) is arranged so that each of the plurality of input beams passes through the illumination pupil. A large field lens is configured to receive at least a portion of each of the plurality of input beams and provide substantially telecentric illumination over a sample being imaged. The large field lens is also configured to receive reflected portions of the substantially telecentric illumination reflected from the sample. The reflected portions pass through an imaging pupil having a second NA that is lower than the first NA and are received by an imaging sensor module that generates image information.

20 Claims, 6 Drawing Sheets

Related U.S. Application Data

(60) Provisional application No. 62/795,640, filed on Jan. 23, 2019.

(52) U.S. Cl.
CPC ............... *G01N 2201/0638* (2013.01); *G01N 2201/126* (2013.01); *G01N 2201/127* (2013.01)

(58) Field of Classification Search
USPC .................................. 356/445–448, 600–640
See application file for complete search history.

(56) References Cited

U.S. PATENT DOCUMENTS

| | | |
|---|---|---|
| 2004/0169861 A1 | 9/2004 | Mieher et al. |
| 2004/0227948 A1 | 11/2004 | Debevec et al. |
| 2004/0246493 A1 | 12/2004 | Kim et al. |
| 2006/0063262 A1 | 3/2006 | Sopori |
| 2006/0109475 A1 | 5/2006 | Misener et al. |
| 2006/0289789 A1 | 12/2006 | Raymond et al. |
| 2009/0213328 A1 | 8/2009 | Isobe et al. |
| 2009/0219518 A1 | 9/2009 | Baldwin et al. |
| 2013/0063719 A1 | 3/2013 | Morris |
| 2015/0043006 A1 | 2/2015 | de Groot |
| 2015/0300809 A1 | 10/2015 | Soitec et al. |
| 2018/0252514 A1 | 9/2018 | Pandev et al. |
| 2019/0302010 A1 | 10/2019 | Porter et al. |
| 2019/0391088 A1 | 12/2019 | Lynch |
| 2020/0232916 A1 | 7/2020 | Zhao et al. |

FOREIGN PATENT DOCUMENTS

| | | |
|---|---|---|
| KR | 10-2011-0089486 A | 8/2011 |
| KR | 10-153-7854 B1 | 7/2015 |
| WO | 2013/181156 A1 | 12/2013 |
| WO | 2016/020925 A1 | 2/2016 |
| WO | 2016/070155 A1 | 5/2016 |

OTHER PUBLICATIONS

U.S. Appl. No. 16/295,173 Restriction Requirement dated May 13, 2020, 7 pages.
U.S. Appl. No. 16/295,173 Notice of Allowance dated Jul. 16, 2020, 9 pages.
U.S. Appl. No. 16/831,643 First Action Interview Pilot Program Pre-Interview Communication dated May 5, 2021, 4 pages.
U.S. Appl. No. 16/831,643 Notice of Allowance dated Jun. 25, 2021, 10 pages.
International Search Report and Written Opinion for Application No. PCT/US2021/022169, dated Jun. 28, 2021, 9 pages.
International Search Report and Written Opinion for Application No. PCT/US2021/022174, dated Jul. 1, 2021, 11 pages.
U.S. Appl. No. 16/831,575 Notice of Allowance dated Jul. 15, 2021, 8 pages.
U.S. Appl. No. 16/831,575 Non-Final Office Action dated Mar. 2, 2021, 13 pages.
International Preliminary Report on Patentability for Application No. PCT/US2020/013185, dated Aug. 5, 2021, 9 pages.
U.S. Appl. No. 16/831,643 Corrected Notice of Allowability dated Sep. 10, 2021, 5 pages.
U.S. Appl. No. 16/831,575 Corrected Notice of Allowability dated Oct. 1, 2021, 5 pages.

IMAGING REFLECTOMETER

CROSS REFERENCE TO RELATED APPLICATIONS

This application is a Divisional of U.S. application Ser. No. 16/295,173, filed Mar. 7, 2019, which claims the benefit of U.S. Provisional Application No. 62/795,640, filed Jan. 23, 2019, the entire contents of which are incorporated herein by reference in their entirety for all purposes.

TECHNICAL FIELD

Embodiments described herein relate generally to imaging reflectometers, and more particularly, to systems and methods that provide high speed and high resolution reflectometry measurements.

BACKGROUND

Performing imaging reflectometry measurements at multiple wavelengths is known as "multi-spectral imaging" (fewer number of wavelengths) or "hyper-spectral imaging" (greater number of wavelengths). Imaging reflectometry can be used to measure critical dimensions (CDs) of small features and thicknesses of films. Systems that perform these measurements typically utilize either a spot scanning mechanism or a line scanning mechanism. For a spot scanning mechanism, a spectrum of each spot is recorded by a spectrometer that generally includes a grating or prism to distribute the spectrum onto a line sensor. For a line scanning mechanism, each row of an area sensor records an image of a scanning line and each column records a spectrum. These mechanism provide flexibility for handling large samples or samples with large measurement fields.

Imaging reflectometry systems that provide improved measurement speed and/or resolution are desired.

SUMMARY

Some embodiments described herein provide high speed and high resolution reflectometry measurements at multiple wavelengths. In accordance with an embodiment, for example, an area imaging technique is used where an area of a sample is illuminated and imaged with an area imaging sensor. A large field lens is used that in some embodiments can illuminate an entire sample to provide full-sample (or full-wafer) imaging. The area images provide measurements across many spots on a sample thus increasing measurement speed. The area imaging sensors can also provide high spatial resolution.

In accordance with an embodiment, an imaging reflectometer includes a source module configured to generate a plurality of input beams. Each of the plurality of input beams may be generated by a different light source, and at least some of the plurality of input beams may have different nominal wavelengths than others of the plurality of input beams. The source module may be configured to sequentially generate different ones of the plurality of input beams at a first switching rate. An illumination pupil has a first numerical aperture (NA). The illumination pupil may be arranged along a first optical path so that each of the plurality of input beams passes through the illumination pupil. A beam splitter is arranged downstream of the illumination pupil along the first optical path. The beam splitter may be configured to direct a first portion of each of the plurality of input beams along a second optical path toward a reference sensor, and allow a second portion of each of the plurality of input beams to pass through the beam splitter and continue along the first optical path. A large field lens is arranged along the first optical path. The large field lens may be configured to receive the second portion of each of the plurality of input beams from the beam splitter, and provide the second portion of each of the plurality of input beams as substantially telecentric illumination over a sample being imaged. The substantially telecentric illumination may have a telecentricity error of less than 0.1 degree over a wavelength range of about 350 nm to about 1100 nm. The large field lens may also be configured to receive reflected portions of the substantially telecentric illumination reflected from the sample, and direct the reflected portions along the first optical path toward the beam splitter where the reflected portions are directed by the beam splitter along a third optical path. An imaging pupil has a second NA that is lower than the first NA of the illumination pupil. The imaging pupil may be arranged downstream of the beam splitter along the third optical path so that the reflected portions pass through the imaging pupil. An imaging sensor module is arranged downstream of the imaging pupil along the third optical path. The imaging sensor module may be configured to receive the reflected portions and generate corresponding image information. The imaging sensor module may be configured to normalize at least part of the image information based on information from the reference sensor. The imaging sensor module may be configured to generate the image information at a frame rate that is the same as or faster than the first switching rate of the source module.

In an embodiment, a measurement field of the large field lens has a diameter of greater than 300 mm.

In another embodiment, a measurement field of the substantially telecentric illumination is larger than the sample being imaged.

In another embodiment, the large field lens is a telecentric lens.

In another embodiment, a field size of the large field lens is smaller than the sample being imaged, and the imaging reflectometer further comprising a sample stage configured to move the sample relative to the measurement field.

In another embodiment, a field size of the large field lens is smaller than the sample being imaged, and the imaging reflectometer is configured to move an optics module to provide different measurement fields on the sample.

In another embodiment, the imaging reflectometer also includes a spot reflectometer disposed downstream of the large field lens between the large field lens and a sample stage. The spot reflectometer may be configured to perform spot reflectometry measurements. A measurement field of the spot reflectometer may be smaller than a measurement field of the large field lens, and a wavelength range of the spot reflectometer is greater than a wavelength range of the large field lens.

In another embodiment, the different light sources include different light emitting diodes (LEDs) or different laser diodes (LDs).

In another embodiment, the source module includes a broadband light source and a set of band pass filters for providing a beam at a selected nominal wavelength.

In another embodiment, each of the plurality of input beams is generated by a different light source.

In another embodiment, the imaging sensor module includes multiple cameras each configured to image an area of the sample.

In yet another embodiment, the imaging sensor module includes a single camera configured to image an entire surface of the sample.

In accordance with another embodiment, a method for measuring reflectivity of a sample includes sequentially generating a plurality of input beams. Each of the plurality of input beams may be generated by a different light source. At least some of the plurality of input beams have different nominal wavelengths than others of the plurality of input beams. Each of the plurality of input beams are directed through an illumination pupil having a first NA. The illumination pupil is arranged along a first optical path. Each of the plurality of input beams are split and a first portion of each of the plurality of input beams are directed along a second optical path toward a reference sensor. A second portion of each of the plurality of input beams are allowed to continue along the first optical path. The second portion of each of the plurality of input beams are provided as substantially telecentric illumination over a sample being imaged using a large field lens. The substantially telecentric illumination has a telecentricity error of less than 0.1 degree over a wavelength range of about 350 nm to about 1100 nm. The reflected portions of the substantially telecentric illumination reflected from the sample are received at the large field lens and the reflected portions are directed along the first optical path toward the beam splitter. The reflected portions are directed through an imaging pupil using the beam splitter. The imaging pupil has a second NA that is lower than the first NA of the illumination pupil. The imaging pupil is arranged downstream of the beam splitter along a third optical path. The reflected portions are received and corresponding image information is generated at an imaging sensor module. At least part of the image information is normalized based on information from the reference sensor.

In an embodiment, the plurality of input beams are sequentially generated at a first switching rate, and the image information is generated at a frame rate that is the same as or faster than the first switching rate.

In another embodiment, generating the plurality of input beams also includes providing a first source power to generate a first input beam of the plurality of input beams, and providing a second source power that is different from the first source power to generate a second input beam of the plurality of input beams. The first source power and the second source power are dependent on the nominal wavelengths of the first input beam and the second input beam respectively.

In yet another embodiment, a measurement field of the large field lens is smaller than the sample being imaged, and the method also includes moving the sample relative to the field of substantially telecentric illumination.

In accordance with yet another embodiment, a method for measuring reflectivity of a sample using an imaging reflectometer that includes a large field lens and a spot reflectometer includes sequentially generating a plurality of input beams at a first switching rate. Each of the plurality of input beams may be generated by a different light source, and at least some of the plurality of input beams may have different nominal wavelengths than others of the plurality of input beams. The method also includes directing each of the plurality of input beams through an illumination pupil having a first NA. The illumination pupil is arranged along a first optical path. The method also includes providing at least a portion of each of the plurality of input beams as substantially telecentric illumination over a sample being imaged using the large field lens, and receiving reflected portions of the substantially telecentric illumination reflected from the sample at the large field lens and directing the reflected portions through an imaging pupil. The imaging pupil has a second NA that is lower than the first NA of the illumination pupil. The method also includes receiving the reflected portions and generating corresponding image information at an imaging sensor module. The image information may be generated at a frame rate that is the same as or faster than the first switching rate. The method also includes performing spot reflectometry measurements on one or more areas of the sample. A measurement field of the spot reflectometer is smaller than a measurement field of the large field lens.

Further aspects, advantages, and features are apparent from the claims, description, and accompanying drawings.

BRIEF DESCRIPTION OF THE DRAWINGS

The various embodiments described herein, both as to organization and method of operation, together with features and advantages thereof, can best be understood by reference to the following detailed description and accompanying drawings, in which.

Figure 1:
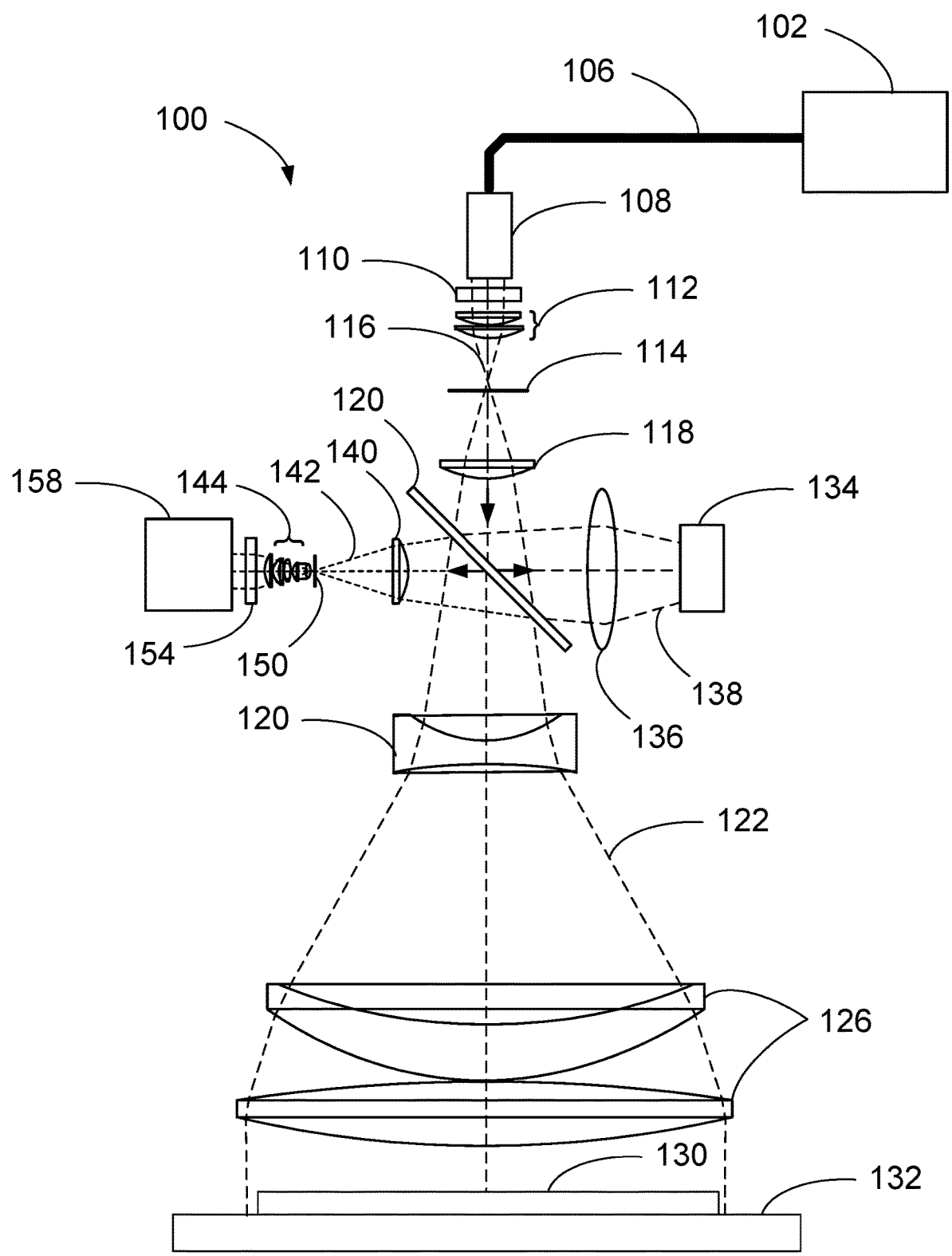
FIG. 1 is a simplified cross-sectional view of an imaging reflectometer in accordance with an embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the embodiments described herein. However, it should be understood that the various embodiments can be practiced without these specific details. In other instances, well-known methods, procedures, and components have not been described in detail so as not to obscure the described features.

Reference will be made in detail to the various embodiments, one or more examples of which are illustrated in the figures. Each example is provided by way of explanation and is not meant as a limitation. Further, features illustrated or described as part of one embodiment can be used on or in conjunction with other embodiments to yield yet further embodiments. The description is intended to include these modifications and variations.

A "specimen" or "sample" as referred to herein, includes, but is not limited to, a semiconductor wafer, a semiconductor work piece, a photolithography mask, and other work pieces such as a memory disk and the like. According to some embodiments, which can be combined with other embodiments described herein, the systems and methods are configured for or are applied to reflectometry applications.

Embodiments described herein relate generally to imaging reflectometry measurements. In accordance with an embodiment, for example, an imaging reflectometer may include a large field lens that can be used to provide full-wafer illumination. Light reflected from the sample passes through the large field lens and is imaged using an imaging sensor.

The light can be provided at multiple wavelengths thus providing measurements at different wavelengths. In an embodiment, a source module is configured to generate a plurality of light beams having different nominal wavelengths. Reflectometry measurements may be performed at the different wavelengths.

FIG. 1 is a simplified cross-sectional view of an imaging reflectometer 100 in accordance with an embodiment. In this example, light from a source module 102 is relayed through a light guide 106 to a homogenizer 108. Light 116 from the homogenizer 108 passes through illumination pupil 114 and is directed toward beam splitter 120. A portion 138 of the light 116 is reflected by the beam splitter 120 toward a reference sensor 134, and a portion 122 of the light passes through the beam splitter 120 and continues along an optical path toward a sample 130.

The portion 122 of the light 116 that passes through the beam splitter 120 is imaged by a large field lens 126 onto the sample 130. Light reflected from the sample 130 is directed through at least a portion of the lens 126 and reflected by the beam splitter 120 toward an imaging sensor 158.

The imaging reflectometer 100 may include a number of other lenses (e.g., 110, 112, 118, 136) that shape and/or direct the light along the optical paths to illuminate the sample 130, to the reference sensor 134, to other lenses (e.g., 120, 140, 144), and to direct the light reflected from the sample to form diffraction limited images on the imaging sensor 158. In some embodiments, for example, the light may pass through one or more polarizers (e.g., polarizers 110, 154). The one or more polarizers can be inserted in an illumination and/or an imaging path to provide enhanced sensitivity for the dimension change of pattern structures and/or film thickness changes on the sample 130 when patterns are not circularly symmetric. Wave plates can also be inserted to alter the phase of the polarized light. The wave plates and/or polarizers can be at fixed angles to provide polarized reflectometry measurements or can be rotating to provide ellipsometry measurements. It should be appreciated that imaging reflectometers in accordance with the embodiments described herein may not include all the optical elements shown in the example of FIG. 1 and/or may include other optical elements that are not included in this example.

The source module 102 provides a multi-wavelength light source. In some embodiments, the multi-wavelength light source is provided by a plurality of light sources. Each of the light sources generates a light beam, and at least some of the light beams have different nominal wavelengths.

In other embodiments, the multi-wavelength light source is provided by adjusting the source power to the source module 102 to generate light beams having different nominal wavelengths. The power of each wavelength can be independently controlled to optimize the dynamic range of measuring reflectance at each wavelength.

In yet other embodiments, the multi-wavelength light source is provided by a broadband light source and a set of band pass filters. The broadband light source may be used with the band pass filters to generate the light beams at selected nominal wavelengths.

In yet other embodiments, the source module 102 may include both a plurality of light sources, a broadband light source, and a set of band pass filters.

In an embodiment, the large field lens 126 has a measurement field size (or illumination area) that is slightly greater than a diameter of the sample 130 so that full-sample images can be acquired by the imaging sensor 158 without scanning the light or moving a stage 132. For example, the large field lens 126 may have a measurement field size of 300 mm or more for measuring a semiconductor wafer having a 300 mm diameter. The large field lens 126 may be a telecentric lens so that light rays traveling from the large field lens 126 to the sample 130 are approximately parallel to an optical axis that is substantially perpendicular to a surface of the sample 130. This provides substantially normal illumination over the entire sample 130 or across an entire measurement field. This can reduce measurement error since the illumination angles are approximately the same. Telecentric imaging allows the light reflected at substantially the same angle across the entire field to reach an imaging sensor. In an embodiment, for example, the light illuminating the sample 130 may have a telecentricity error of less than 0.3 degrees over a wavelength range of about 350 nm to about 1200 nm, and in some embodiments, a telecentricity error of less than 1% over a wavelength range of about 350 nm to about 1100 nm. As used herein, the telecentricity error is a measure of angular deviation of the chief light ran incident and reflected from the wafer surface from normal (or from the optical axis).

In some embodiments, the large field lens 126 has a field size that is smaller than a diameter of the sample 130. In this case, an area (or measurement field) is imaged and the optics and/or the stage 132 may be moved and/or the optical module may be scanned to image adjacent fields. Depending on the application, a measurement field may be approximately the same size as a die or stepper field. Adjacent images may be stitched using known techniques to provide multi-field or full-sample images.

The imaging sensor 158 may be an area imaging sensor that includes one or more digital cameras for capturing the light 142 that is reflected from the sample 130 and passes through imaging pupil 150. The imaging sensor 158 provides an image of the sample 130 based on the received light 142. The imaging sensor 158 may include a single camera in some embodiments that is configured to image the entire surface of the sample 130. The imaging sensor 158 may include multiple cameras in that embodiments that each image adjacent or slightly overlapping fields (or areas) on the sample 130. Adjacent images may be stitched together using known techniques. Image resolution may be increased by using a higher resolution imaging sensor or using multiple imaging sensors that each image a smaller field.

The imaging reflectometer 100 includes an illumination path that provides light to the sample 130 and an imaging path that provides light to the imaging sensor 158. This allows independent control of an illumination numerical aperture (NA) and an imaging NA. Merely by way of example, if the imaging sensor 158 has an array size of 5120 pixels by 5120 pixels and the imaging NA is about 0.004, the pixel size on the sample 130 is about 60 µm for a 300 mm wafer, which has a Rayleigh resolution of about 55 µm at a wavelength of 365 nm and a Rayleigh resolution of about 153 µm at a wavelength of 1 µm. Generally, the illumination NA is greater than the imaging NA to correct residual chromatic telecentric errors and to provide tolerance to tilt and bow of the sample 130. In some embodiments, the illumination NA may range from about 0.005 to about 0.5, and the imaging NA may range from about 0.003 to about 0.2.

The reference sensor 134 may include one or more digital cameras for capturing the light 138 that is reflected from the beam splitter 120. The reference sensor 134 may have a lower resolution than the imaging sensor 158. The reference sensor 134 may be used to monitor uniformity and stability of the light 138 and to provide real time calibration of the reflectance measurements made by the imaging sensor 158. Measurements at the reference sensor 134 may be used to adjust characteristics of the light sources (e.g., output power) to provide spatial and temporal corrections.

Figure 2:
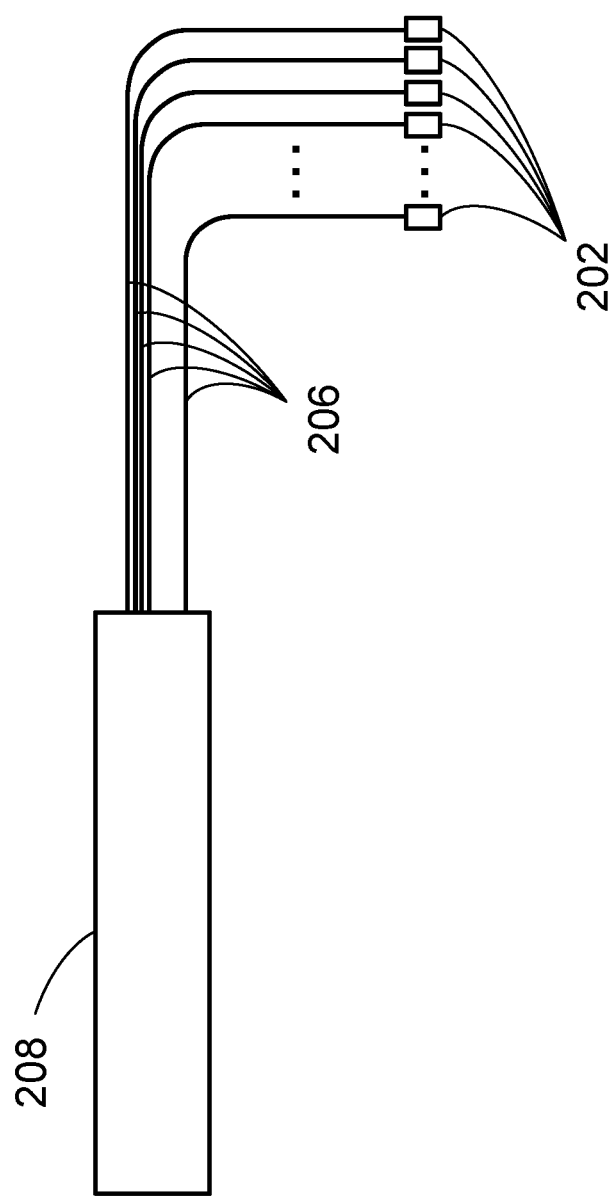
FIG. 2 is a simplified cross-sectional view of a multi-wavelength light source in accordance with an embodiment.

FIG. 2 is a simplified cross-sectional view of a multi-wavelength light source in accordance with an embodiment. The multi-wavelength light source may be used, for example, as part of the source module 102 in the imaging reflectometer 100 of FIG. 1. The multi-wavelength light source includes a plurality of light sources 202 and a plurality of optical fibers 206. The light sources 202 may each include one or more light emitting diodes (LEDs) and/or laser diodes (LDs). The light sources 202 are each optically coupled with a homogenizer 208 by one of the optical fibers 206. Each of the light sources 202 generates a beam, and at least some of the beams may have different nominal wavelengths. Light from the homogenizer 208 may be directed to a large field lens and used to image a sample as described with regard to FIG. 1.

In an embodiment, the multi-wavelength source sequentially generates different ones of the input beams and/or sequentially generates combinations of multiple input beams. The beams may be sequentially generated at a switching rate that is generally the same as the frame rate of an imaging sensor (e.g., the imaging sensor 158 shown in FIG. 1) to achieve one image per wavelength of the same field on a sample. The frame rate of a sensor can be faster than the wavelength switching rate in some embodiments. A faster switching rate enables averaging of multiple images at each wavelength to achieve higher signal to noise ratio. Output power for each of the light sources 202 may be independently controlled and adjusted so that the sensor signal is close to saturation at each wavelength to maximize signal to noise ratio. Each of the light sources 202 may have sufficient output power to enable high speed measurements (or measurements at or near a readout speed of the imaging sensor).

In some embodiments, the optical throughput may be increased for the large field size by inserting diffusers between the optical fibers 206 and the homogenizer 208. Multiple light sources 202 can be combined by other means such as dichroic beam splitters, and the light sources 202 can be coupled into the homogenizer 208 by other means such as free space optics relay.

In some embodiments, band pass filters can be inserted between each of the light sources 202 and their respective optical fiber 206 to narrow the bandwidth of each wavelength. Narrower bandwidths can provide better sensitivity for measurement of thick film stacks or dense patterns. Bandpass filters can define measurement wavelengths accurately by eliminating the wavelength drift of LEDs to improve measurement accuracy.

The imaging sensor (e.g., the imaging sensor 158 shown in FIG. 1) may have a high readout speed (e.g., 50 to 1000 frames per second (FPS) or more and up to 100 million pixels per frame or more). As an example, at a readout speed of 100 FPS, the imaging sensor may be capable of performing 6000 reflectivity measurements per minute. The measurements can be at the same or different wavelengths. Obtaining multiple measurements at the same wavelength can enhance signal-noise ratio and improve measurement sensitivity.

Figure 3:
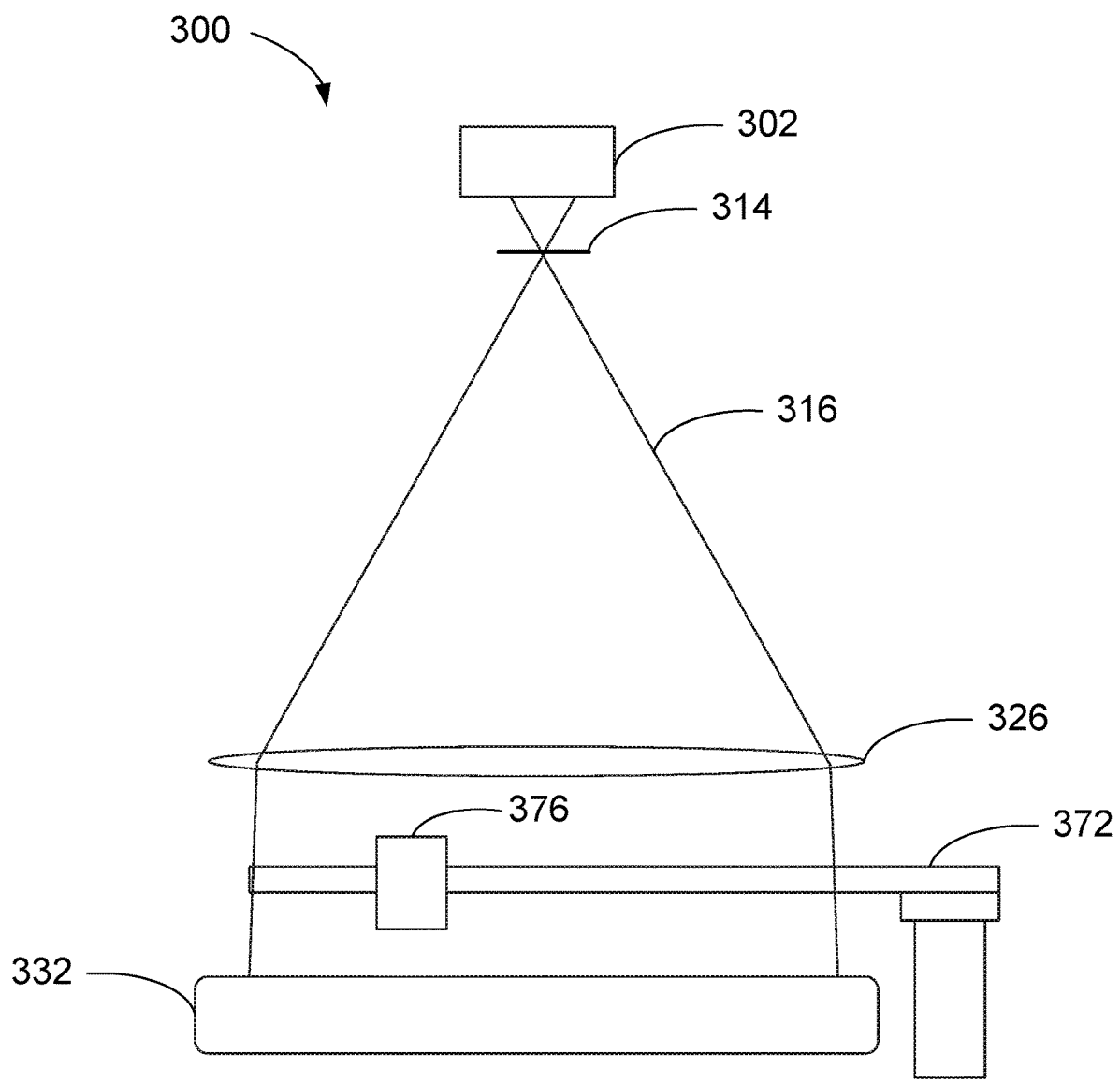
FIG. 3 is a simplified cross-sectional view of an imaging reflectometer system configured to provide area reflectometry measurements and spot reflectometry measurements in accordance with an embodiment.

FIG. 3 is a simplified cross-sectional view of an imaging reflectometer system 300 configured to provide area reflectometry measurements and spot reflectometry measurements in accordance with an embodiment. In this example, light from a source module 302 passes through an illumination pupil 314 and is directed toward a large field lens 326. The large field lens 326 has a field size (or illumination area) that enables area reflectometry measurements without scanning the light or moving the stage 332. The large field lens 326 may be a telecentric lens so that light rays traveling from the large field lens 326 to a sample are substantially parallel to an optical axis and have a low telecentricity error similar to the reflectometer of FIG. 1 described above.

In this example, the imaging reflectometer system 300 also includes a spot reflectometer 376. The spot reflectometer 376 may be a high sensitivity reflectometer that enables spot reflectometry measurements. The spot reflectometer 376 may be mounted on a robotic arm 372 that allows movement of the spot reflectometer 376 to any position over a sample for spot measurements and/or movement outside a field of view of the large field lens 326 during area measurements. The robotic arm may be, for example, an R-theta robotic arm. Alternatively, the stage 332 may be an x-y scanning stage that positions a sample under the large field lens 326 or the spot reflectometer 376.

In some embodiments, the large field lens 326 may be used to perform full-sample or large area reflectometry measurements. Using the area measurements, a particular spot or spots on the sample may be identified for further measurements, and the spot reflectometer 376 may be used to perform spot reflectometry measurements at the particular spots. A wavelength range of the spot reflectometer 376 may be greater than a wavelength range of the large field lens 326.

FIG. 3 is a simplified cross-sectional view of the imaging reflectometer system 300, and many parts and components are not shown for simplicity. For example, this figure does not separately show a beam splitter, a reference sensor, an imaging sensor, an imaging pupil, and/or a number of other components. It should be appreciated that the imaging reflectometer system 300 may include these and other components such as those described with regard to FIG. 1 and/or other conventional reflectometer systems.

Figure 4:
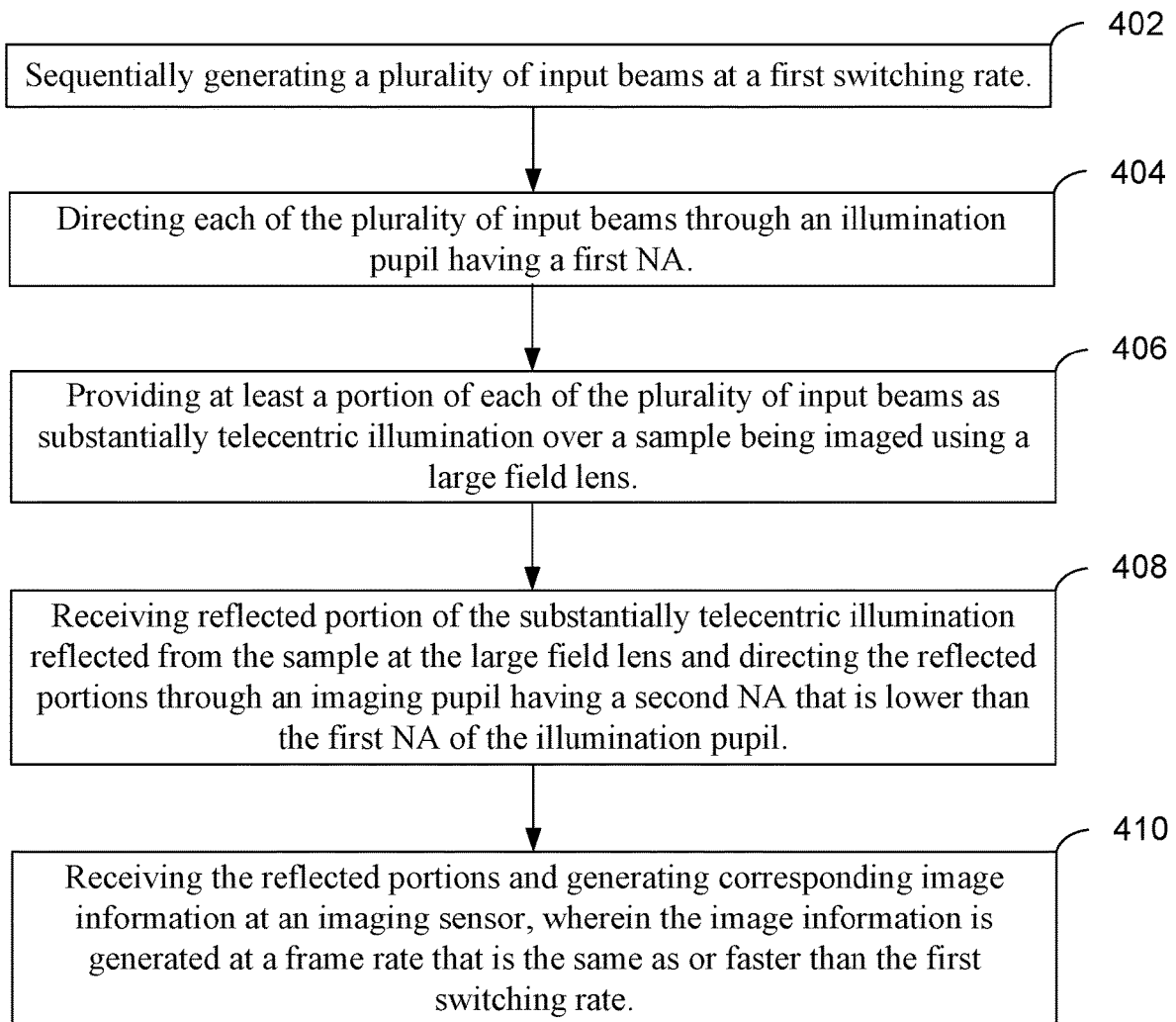
FIGS. 4-6 are flowcharts outlining methods for measuring reflectivity of samples in accordance with some embodiments.

FIG. 4 is a flowchart outlining a method for measuring reflectivity of a sample using an imaging reflectometer that includes a large field lens in accordance with an embodiment. The method includes sequentially generating a plurality of input beams at a first switching rate (402). In some embodiments, each of the plurality of input beams are generated by a different light source, and at least some of the plurality of input beams may have different nominal wavelengths than others of the plurality of input beams. In other embodiments, at least some of the plurality of input beams are generated by a broadband light source, and a wavelength of each of the plurality of input beams is provided using a set of band pass filters.

Each of the plurality of input beams is directed through an illumination pupil having a first NA (404). The illumination pupil may be arranged along a first optical path. In some embodiments, each of the plurality of input beams may be split, and a first portion of each of the plurality of input beams may be directed along a first optical path toward a reference sensor, and a second portion of each of the plurality of input beams may be allowed to continue along the first optical path.

At least a portion of each of the plurality of input beams is provided as substantially telecentric illumination over a sample being imaged using the large field lens (406). A portion of each of the plurality of input beams may also be provided to a reference sensor for monitoring uniformity and stability of the input beams. In some embodiments, a measurement field of the large field lens may larger than the sample being imaged to provide full-sample measurements.

Reflected portions of the substantially telecentric illumination reflected from the sample are received at the large field lens and directed through an imaging pupil having a second NA that is lower than the first NA of the illumination pupil (408). The reflected portions may be directed through the imaging pupil using a beam splitter.

The reflected portions are received and corresponding image information is generated at an imaging sensor module, wherein the image information is generated at a frame rate that is the same as or faster than the first switching rate (410). The image information may be calibrated or normalized based on information from the reference sensor.

Figure 5:
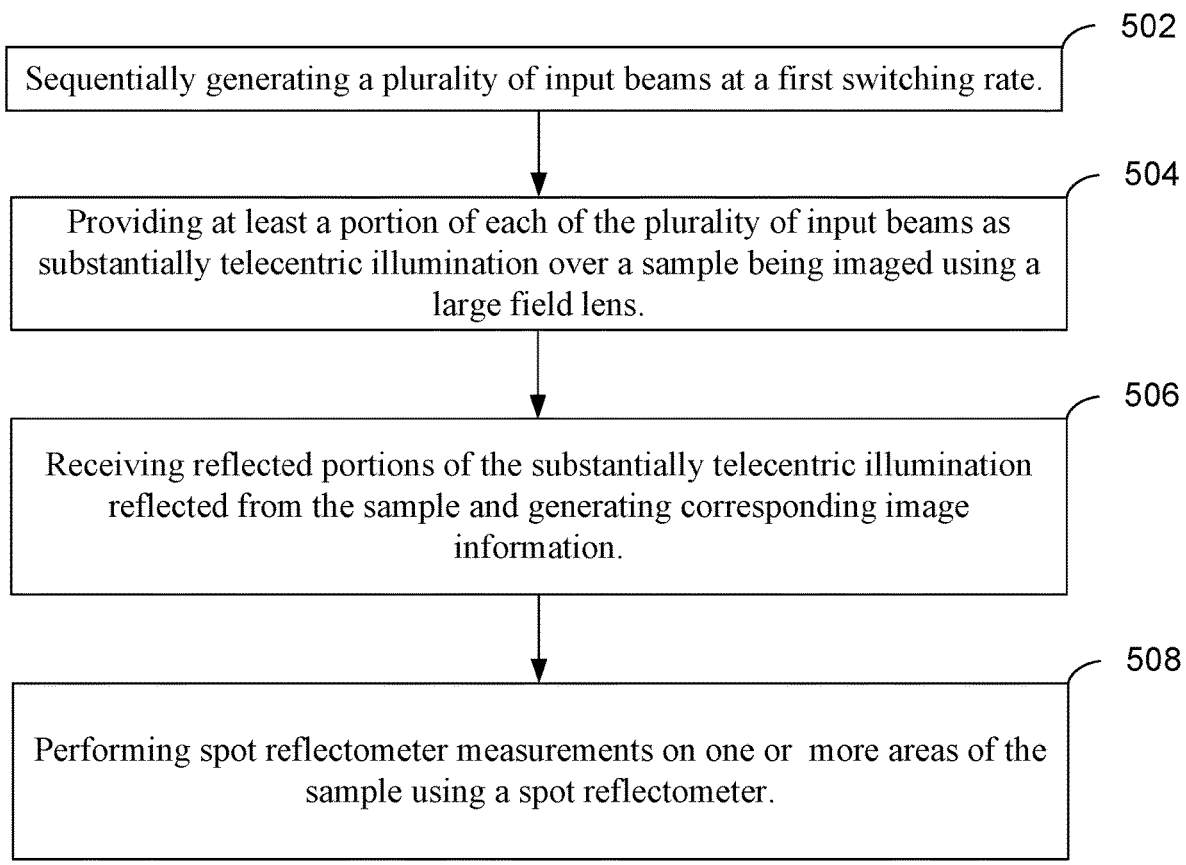

FIG. 5 is a flowchart outlining a method for measuring reflectivity of a sample using an imaging reflectometer that includes a large field lens and a spot reflectometer in accordance with an embodiment.

The method includes sequentially generating a plurality of input beams at a first switching rate (502), and providing at least a portion of each of the plurality of input beams as substantially telecentric illumination over a sample being imaged using the large field lens (504).

The method also includes receiving reflected portions of the substantially telecentric illumination reflected from the sample and generating corresponding image information (506), and performing spot reflectometry measurements on one or more areas of the sample using the spot reflectometer (508). The image information obtained using the large field lens may provide full-sample or large area measurements that are used to identify the areas for the spot reflectometry measurements. For example, a full-sample image may be obtained using the large field lens, and hot spots or other areas of interest may then be measuring using the spot reflectometer.

Figure 6:
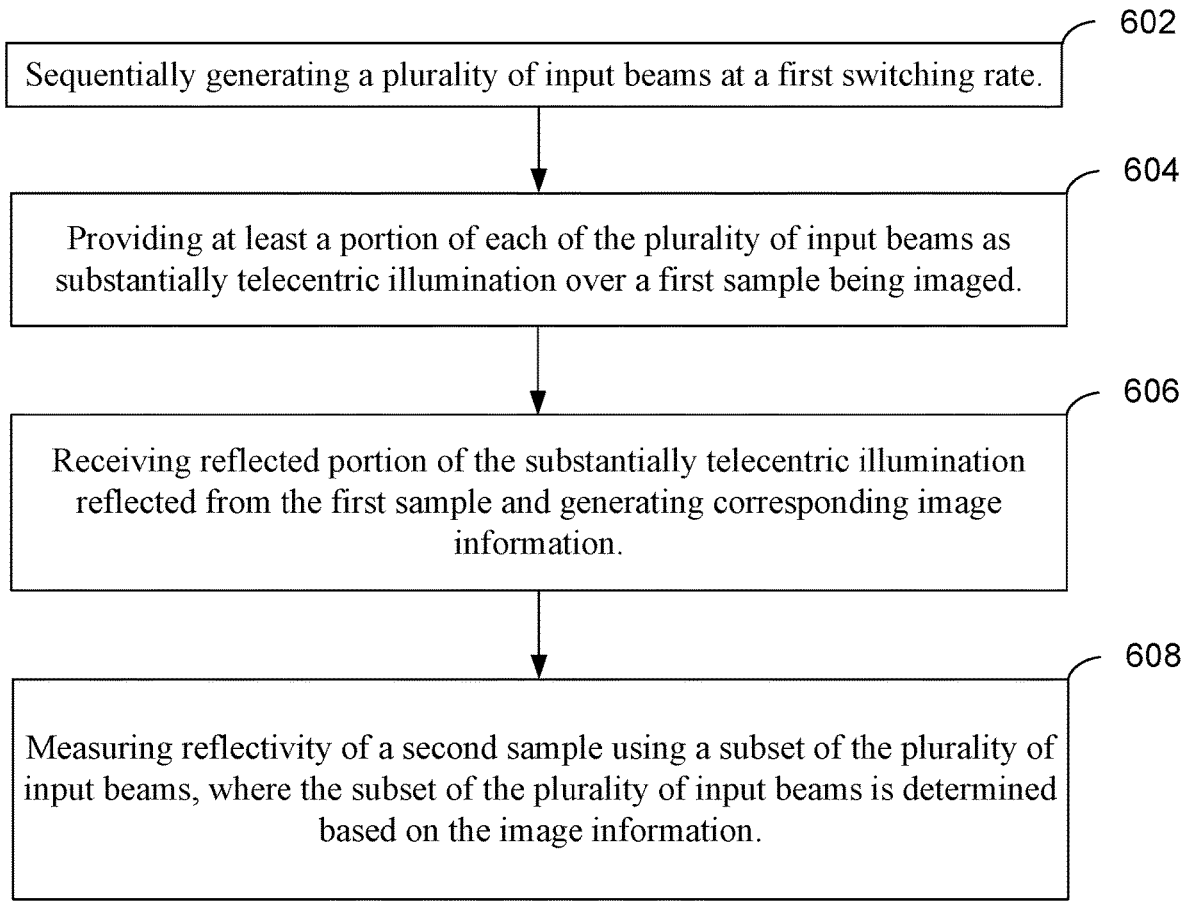

FIG. 6 is a flowchart outlining a method for measuring reflectivity of a sample in accordance with yet another embodiment. The method includes sequentially generating a plurality of input beams at a first switching rate (602), providing at least a portion of each of the plurality of input beams as substantially telecentric illumination over a first sample being imaged (604), and receiving reflected portions of the substantially telecentric illumination reflected from the first sample and generating corresponding image information (606). The method also includes measuring reflectivity of a second sample using a subset of the plurality of input beams, where the subset of the plurality of input beams is determined based on the image information (608). At least some of the plurality of input beams may have different nominal wavelengths, and the image information obtained in step (606) may be used to identify those wavelengths that provide a particular sensitivity or measurement result that may be dependent on the structures and/or films on the sample.

It should be appreciated that the specific steps illustrated in FIGS. 4-6 provide particular methods for measuring reflectivity according to some embodiments. Other sequences of steps may also be performed according to alternative embodiments. For example, alternative embodiments may perform the steps outlined above in a different order. Moreover, the individual steps illustrated in FIGS. 4-6 may include multiple sub-steps that may be performed in various sequences. Furthermore, additional steps may be added or removed depending on the particular application.

In some embodiments, images obtained using embodiments described herein may be processes to identify process excursions. The images may be processed in accordance with known excursion identification techniques. For example, the reflectance measured at multiple wavelengths can be compared to modeled reflectance or known good samples. Measured patterns may also be compared at different locations across the sample to identify variation and/or outliers. Measured variation can be quantified by calculating root-mean-squared (RMS) difference at multiple wavelengths. Measurement sensitivity can be enhanced by selecting the wavelength or wavelengths that have the highest sensitivity to process variation based on measurement data. Multiple wavelength reflectance can be processed by non-linear regression to a theoretical model to derive film thickness and/or CD or a pattern.

It should be appreciated that the imaging reflectometers described herein may be configured as standalone metrology tools or integrated with other metrology or process tools. As an example, an imaging reflectometer as described herein may be integrated with a process tool and arranged outside a window separating the imaging reflectometer from a process chamber. In some embodiments, a large field lens arranged outside the window provides illumination for a sample arranged inside the process chamber. The large field lens may be configured to provide illumination to all or a portion of the sample (e.g., a measurement field size may be about the size of a die or stepper field). This allows reflectometry measurements to be performed during and/or immediately after processing while samples are inside a vacuum chamber. This can shorten the control loop, improve process control, and avoid material damage caused by air environment.

While the foregoing is directed to specific embodiments, other and further embodiments may be devised without departing from the basic scope thereof, and the scope thereof is determined by the claims that follow.

What is claimed is:

1. A method for measuring reflectivity of a sample using an imaging reflectometer that includes a large field lens and a spot reflectometer, the method comprising:
   sequentially generating a plurality of input beams at a first switching rate, each of the plurality of input beams generated by a different light source, at least some of the plurality of input beams having different nominal wavelengths than others of the plurality of input beams;
   directing each of the plurality of input beams through an illumination pupil having a first numerical aperture (NA), the illumination pupil arranged along a first optical path;
   providing at least a portion of each of the plurality of input beams as substantially telecentric illumination over a sample being imaged using the large field lens;
   receiving reflected portions of the substantially telecentric illumination reflected from the sample at the large field lens and directing the reflected portions through an imaging pupil, the imaging pupil having a second NA that is lower than the first NA of the illumination pupil;
   receiving the reflected portions and generating corresponding image information at an imaging sensor module, wherein the image information is generated at a frame rate that is the same as or faster than the first switching rate; and performing spot reflectometry measurements on one or more areas of the sample, wherein a measurement field of the spot reflectometer is smaller than a measurement field of the large field lens.

2. The method of claim 1 wherein the measurement field of the large field lens is larger than the sample being imaged.

3. The method of claim 1 wherein the measurement field of the large field lens is smaller than the sample being imaged.

4. The method of claim 1 wherein performing the spot reflectometry measurements includes moving a robotic arm on which the spot reflectometer is mounted.

5. The method of claim 4 wherein the robotic arm is an R-theta robotic arm.

6. The method of claim 1 further comprising positioning the sample under the large field lens using an x-y scanning stage.

7. The method of claim 1 further comprising positioning the sample under the spot reflectometer using an x-y scanning stage.

8. The method of claim 1 further comprising splitting each of the plurality of input beams and directing a first portion of each of the plurality of input beams along a second optical path toward a reference sensor and allowing a second portion of each of the plurality of input beams to continue along the first optical path to provide at least the portion of the plurality of input beams as substantially telecentric illumination over the sample being imaged.

9. The method of claim 1 wherein the substantially telecentric illumination has a telecentricity error of less than 0.1 degree over a wavelength range of about 350 nm to about 1100 nm.

10. The method of claim 1 wherein sequentially generating the plurality of input beams comprises:
providing a first source power to generate a first input beam of the plurality of input beams; and
providing a second source power that is different from the first source power to generate a second input beam of the plurality of input beams, wherein the first source power and the second source power are dependent on the nominal wavelengths of the first input beam and the second input beam respectively.

11. The method of claim 1 wherein each of the plurality of input beams is generated by a different light source, and the different light sources include different light emitting diodes (LEDs) or different laser diodes (LDs).

12. The method of claim 1 wherein the measurement field of the large field lens is smaller than the sample being imaged, and the method further comprises moving the sample relative to a field of the substantially telecentric illumination.

13. A method for measuring reflectivity of a sample using an imaging reflectometer that includes a large field lens and a spot reflectometer, the method comprising:
sequentially generating a plurality of input beams at a first switching rate, each of the plurality of input beams generated by a different light source, at least some of the plurality of input beams having different nominal wavelengths than others of the plurality of input beams;
directing each of the plurality of input beams through an illumination pupil having a first numerical aperture (NA), the illumination pupil arranged along a first optical path;
splitting each of the plurality of input beams and directing a first portion of each of the plurality of input beams along a second optical path toward a reference sensor and allowing a second portion of each of the plurality of input beams to continue along the first optical path;
providing the second portion of each of the plurality of input beams as substantially telecentric illumination over a sample being imaged using the large field lens, the substantially telecentric illumination having a telecentricity error of less than 0.1 degree over a wavelength range of about 350 nm to about 1100 nm;
receiving reflected portions of the substantially telecentric illumination reflected from the sample at the large field lens and directing the reflected portions through an imaging pupil, the imaging pupil having a second NA that is lower than the first NA of the illumination pupil;
receiving the reflected portions and generating corresponding image information at an imaging sensor module, wherein the image information is generated at a frame rate that is the same as or faster than the first switching rate; and
performing spot reflectometry measurements on one or more areas of the sample, wherein a measurement field of the spot reflectometer is smaller than a measurement field of the large field lens.

14. The method of claim 13 wherein the measurement field of the large field lens is larger than the sample being imaged.

15. The method of claim 13 wherein the measurement field of the large field lens is smaller than the sample being imaged.

16. The method of claim 13 wherein performing the spot reflectometry measurements includes moving a robotic arm on which the spot reflectometer is mounted.

17. The method of claim 13 further comprising positioning the sample under the large field lens using an x-y scanning stage.

18. The method of claim 13 further comprising positioning the sample under the spot reflectometer using an x-y scanning stage.

19. The method of claim 13 wherein sequentially generating the plurality of input beams comprises:
providing a first source power to generate a first input beam of the plurality of input beams; and
providing a second source power that is different from the first source power to generate a second input beam of the plurality of input beams, wherein the first source power and the second source power are dependent on the nominal wavelengths of the first input beam and the second input beam respectively.

20. The method of claim 13 wherein each of the plurality of input beams is generated by a different light source, and the different light sources include different light emitting diodes (LEDs) or different laser diodes (LDs).

* * * * *